United States Patent
Page et al.

(10) Patent No.: US 11,050,916 B2
(45) Date of Patent: Jun. 29, 2021

(54) BODY-WORN VIDEO SURVEILLANCE SYSTEM

(71) Applicant: Kustom Signals, Inc., Lenexa, KS (US)

(72) Inventors: Warren Page, Lenexa, KS (US); Michael Paulson, Lawrence, KS (US); Dave Teeter, Lenexa, KS (US)

(73) Assignee: Kustom Signals, Inc., Lenexa, KS (US)

(*) Notice: Subject to any disclaimer, the term of this patent is extended or adjusted under 35 U.S.C. 154(b) by 0 days.

(21) Appl. No.: 16/202,363

(22) Filed: Nov. 28, 2018

(65) Prior Publication Data

US 2019/0098198 A1 Mar. 28, 2019

Related U.S. Application Data

(63) Continuation of application No. 15/540,296, filed as application No. PCT/US2015/063259 on Dec. 1, 2015, now abandoned.

(60) Provisional application No. 62/085,977, filed on Dec. 1, 2014.

(51) Int. Cl.
| | |
|---|---|
| *H04N 5/232* | (2006.01) |
| *H04N 7/18* | (2006.01) |
| *H04N 21/422* | (2011.01) |
| *H04N 21/4363* | (2011.01) |
| *G06F 1/16* | (2006.01) |

(52) U.S. Cl.
CPC ......... *H04N 5/23203* (2013.01); *H04N 7/185* (2013.01); *H04N 21/42203* (2013.01); *H04N 21/43637* (2013.01); *G06F 1/1632* (2013.01)

(58) Field of Classification Search
CPC ............... H04N 5/23203; H04N 7/185; H04N 21/43637; H04N 21/42203; G06F 1/1632
USPC .......................................................... 348/158
See application file for complete search history.

(56) References Cited

U.S. PATENT DOCUMENTS

| | | | |
|---|---|---|---|
| 2003/0016834 A1 | 1/2003 | Blanco et al. | |
| 2003/0080878 A1 | 5/2003 | Kirmuss | |
| 2005/0078195 A1* | 4/2005 | VanWagner | H04N 5/772 348/231.3 |
| 2005/0100329 A1 | 5/2005 | Lao et al. | |
| 2006/0165160 A1 | 7/2006 | Winningstad et al. | |
| 2006/0270465 A1 | 11/2006 | Lee et al. | |
| 2007/0030351 A1 | 2/2007 | Blanco et al. | |
| 2010/0313335 A1 | 12/2010 | Waters | |
| 2013/0163052 A1* | 6/2013 | Yamaguchi | G06Q 30/06 358/1.15 |
| 2013/0342333 A1* | 12/2013 | Hutchings | H04N 7/18 340/435 |

(Continued)

*Primary Examiner* — Allen C Wong
(74) *Attorney, Agent, or Firm* — Erickson Kernell IP, LLC

(57) ABSTRACT

A body-worn surveillance system is associated with the ICV system via a docking mechanism that is connected to the ICV system via a cable, or other means. The ICV system recognizes the specific body-worn system(s). In order to reduce power draw on the mobile battery powered BWV device and thus extend record time(s), the BWV wireless radio is left in a suspended or sleep state and the lower power draw Bluetooth radio is enabled. When the body-worn system is within a specified proximity (RSSI) of the ICV system's wireless Bluetooth transceiver and there are recorded files available for transfer, the BWV device's wireless Ethernet connection will be enabled to transfer AV files to the ICV system, which will then store those files on the ICV system's internal media.

43 Claims, 6 Drawing Sheets

(56) References Cited

U.S. PATENT DOCUMENTS

2015/0086175 A1* 3/2015 Lorenzetti ............ H04N 9/8211
                                                      386/226
2015/0304843 A1* 10/2015 Hillyard .................. G06F 8/654
                                                        726/5

* cited by examiner

BODY-WORN VIDEO SURVEILLANCE SYSTEM

CROSS-REFERENCE TO RELATED APPLICATIONS

This is a continuation of U.S. patent application Ser. No. 15/540,296, filed Jun. 28, 2017, which is the National Stage of International Application No. PCT/US2015/63259, filed Dec. 1, 2015, which claims the benefit of application Ser. No. 62/085,977, filed Dec. 1, 2014, all entitled BODY-WORN VIDEO SURVEILLANCE SYSTEM.

FIELD

This invention is directed to a video surveillance system, and in particular to a video surveillance system that is body-worn or officer-worn for producing a permanent digital evidentiary record, on a multi-media disk, working in concert with an In-Car Video System (ICV), of a traffic stop or other event and incidents related to that event.

BACKGROUND

In law enforcement, a reliable witness that is incapable of perjury is needed to substantiate the actions taken by the law enforcement officer and to protect the officer against false allegations by the persons involved in the incident. An excellent witness of this type is a video recording of the incident, now widely used in traffic stops and criminal interdictions, which can be reviewed after the incident and archived. By recording the incident firsthand as it actually happened, video recordings eliminate conflicting individual interpretations of the incident and facilitate effective and efficient law enforcement.

Body-Worn Audio/Video (BWV) devices that make audio/video records of an incident or scene are well known in the art. However, there has not been an effective method for the body-worn video to be associated with the ICV system, and other items of data associated with the traffic stop. Additionally, retrieving the in-car video and associating it with the body-worn video of the same incident have been problematic for back-office applications.

SUMMARY

The digital video surveillance system of the present invention includes a body-worn video server which allows recording to various digital media including SD cards, SSDs, Compact Flash disks, mSATA devices or the like. This system includes a memory buffer that is recording at all times. When the recorder is activated, the memory buffer contents, including video and audio, will be recorded onto the media before the system starts recording directly from the video camera and/or microphone. This ensures that the activity occurring just prior to the activation of the system is recorded as well. The system incorporates a Bluetooth transceiver and a wireless Ethernet device that work in conjunction with the ICV system.

The body-worn audio/video (BWV) device is associated with the ICV system-via a docking mechanism that is connected to the ICV system via a cable. This docking procedure transfers information to the body worn device that allows association to the specific ICV system that the bodyworn unit has been docked with. The docking procedure also sends beacon information to the Bluetooth transceiver connected to the ICV system. A specific identification, such as a secure Universally Unique Identifier (UUID) may be used to associate that BWV device with the ICV system. The ICV system may now recognize the specific body-worn system, or multiple body-worn systems (for multi-officer vehicles), and no others unless the device is paired again. In order to reduce power draw on the mobile battery powered BWV device and thus extend record time(s), the BWV wireless radio may be left in a suspended or sleep state and the lower power draw Bluetooth radio may be enabled. When the BWV is within close enough proximity (via a specified Received signal Strength Indication—RSSI) of the ICV system's Bluetooth transceiver to detect it via the wireless Bluetooth connection and there are recorded files available for transfer, the BWV device's wireless Ethernet connection (an IEEE 802.11 b/g/n/ac or other radio) will be enabled to transfer AV files to the ICV system, which will then be stored on the ICV system's internal media. The advantage of this approach is that the battery life of the BWV device is extended and the faster 802.11 (or other) wireless radio is used as the data transfer mechanism, as Bluetooth activity consumes much less power than wireless (or other) Ethernet devices, but transmits data much slower. Once any files are transferred, the BWV wireless radio may be disabled to conserve power whether the device is within Bluetooth range of the ICV system or not.

An alternate method of transferring files from the BWV device would be to leave the device in its docking station. Once the device has been docked for a pre-determined amount of time or user initiated, any recorded files may be transferred via a cable to the ICV system's storage.

The Bluetooth connectivity with the ICV may also be used as a triggering method for record on the BWV device. If configured accordingly, once the BWV device is out of range (as per a specified RSSI), the BWV device may be activated into record mode thereby recording events that may be "unseen" by the ICV system. This recording session may be manually terminated by the user.

Additionally, when the ICV has entered a record state, the ICV's Bluetooth beacon reflects this change in state, causing the BWV device to also enter a record state. Alternatively, if the BWV device is placed into a record state, and the ICV is not in a record state, the BWV device may send commands wirelessly to the ICV system to place it into a record state.

File names for the recorded events, on both the ICV and BWV device, when triggered by the other, may include event timestamps, and other identifiers allowing the ICV video files and BWV device video files to be associated with the same event.

The advantage of this invention will become apparent from the following description taken in connection with the accompanying drawings, wherein is set forth by way of illustration and example, a preferred embodiment of the present invention.

An association of the BWV and ICV files may be added to the metadata, before the files are transferred to the file management system. When the BWV and ICV systems are paired or synced the BWV's metadata files may be modified with a car-specific identifier. That then makes is much easier to fine the right BWV that was recorded by that particular officer—and that can appropriately be associated with an ICV file recorded at the same time.

DETAILED DESCRIPTION

Figure 1:
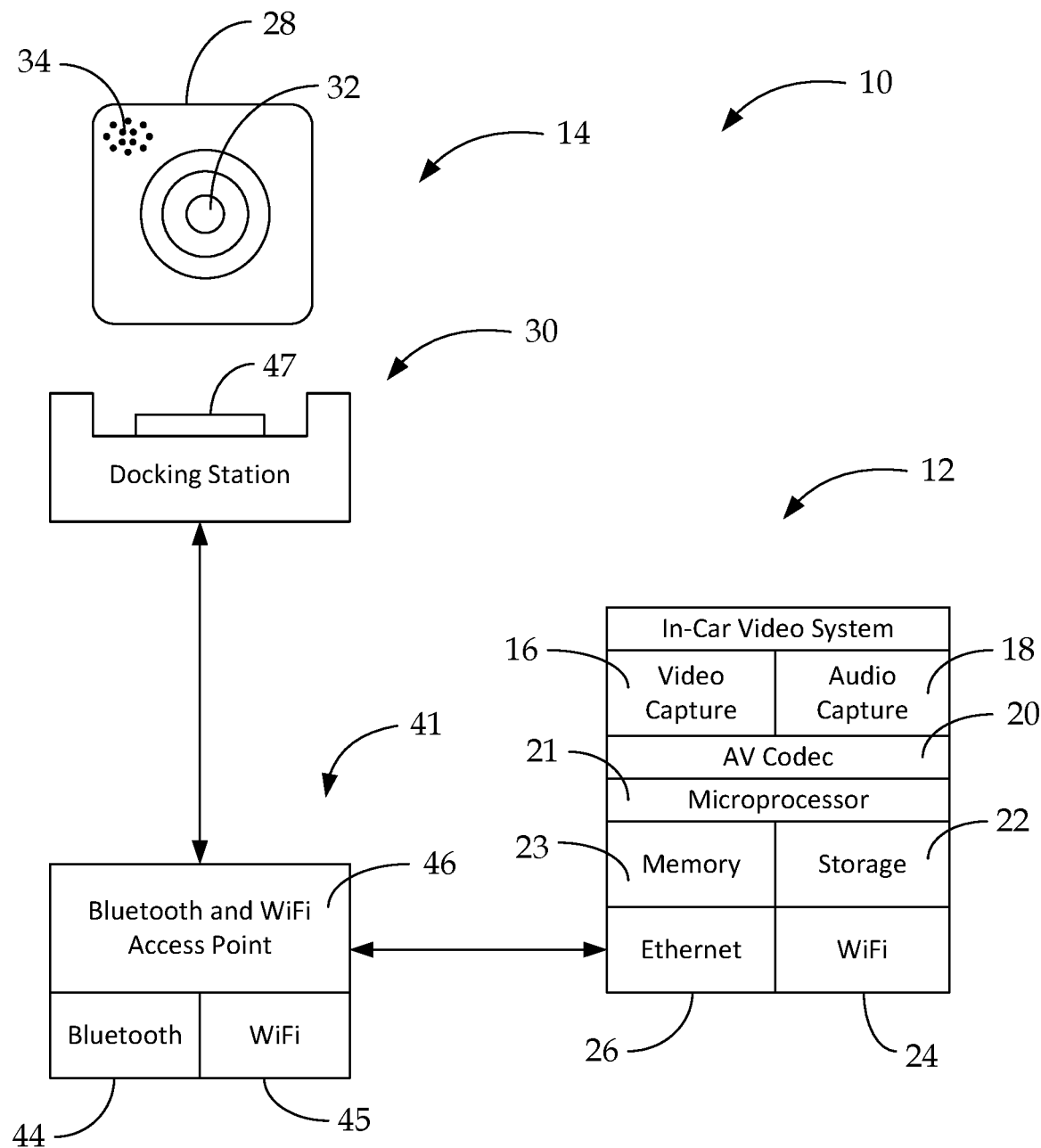
FIG. 1 is a block diagram illustrating the basic components of the body-worn digital video surveillance system, and the components of interaction between the BWV device and the ICV system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

The digital video surveillance system of the present invention includes a body-worn video surveillance system which allows recording to various digital media. The system incorporates a Bluetooth transceiver and a wireless Ethernet device that work in conjunction with ICV systems such as the G3 Vision, G3 Vision Extreme, Eyewitness HD, and Eyewitness Data Vault, available from Kustom Signals, Inc.

The BWV device (or multiples) is associated with the ICV system via a docking mechanism that is connected to the ICV system via a cable, or other means. The ICV system will now recognize the specific BWV system(s), and no others. In order to reduce power draw on the mobile battery powered BWV device and thus extend record time(s), the BWV wireless radio is left in a suspended or sleep state and the lower power draw Bluetooth radio is enabled. When the BWV system is within a specified proximity (RSSI) of the ICV system's wireless Bluetooth transceiver and there are recorded files available for transfer, the BWV device's wireless Ethernet connection (an IEEE 802.11 b/g/n/ac or similar radio) will be enabled to transfer AV files to the ICV system, which will then store those files on the ICV system's internal media. The advantage of this approach is that the battery life of the BWV system is extended and the faster 802.11 (or similar) wireless radio is used as the data transfer mechanism, as Bluetooth activity consumes much less power than wireless (or other) Ethernet devices, but transmits data much slower. Once any files are transferred, the BWV wireless radio is disabled to conserve power whether the device is within Bluetooth range of the ICV system or not.

An alternate method of transferring files from the BWV device would be to return the device to its docking station. Once the device has been docked for a pre-determined amount of time, any recorded files can be transferred via a cable to the ICV system's storage.

The Bluetooth connectivity with the ICV may also be used as a triggering method for record on the BWV device. If configured accordingly, once the BWV device is outside of a specified range (determined via RSSI), of the ICV system, the bodyworn device may be activated into Record thereby recording events that may be "unseen" by the ICV system. This recording session may be manually terminated by the user.

The Bluetooth connectivity with the ICV may also be used to place the bodyworn device into record. If configured accordingly, when the ICV is placed into record, the Bluetooth beacon that is broadcasted will reflect this, causing the bodyworn system to be placed into record as well.

The bodyworn system may have the same effect on the ICV. If configured accordingly, the bodyworn system will send a command via a wireless signal (802.11 b, g, n, AC, or others) to the ICV, causing it to be placed into record.

Any of these triggering events from one system that causes the other to be placed into record will also pass data to the recipient device in the form of filename data, recorded file embedded metadata, and other means to associate the body worn system's video file and the ICV system's video file with each other for a particular recording event. This allows these files to be easily searched per events that took place to cause the recordings.

Figure 2:
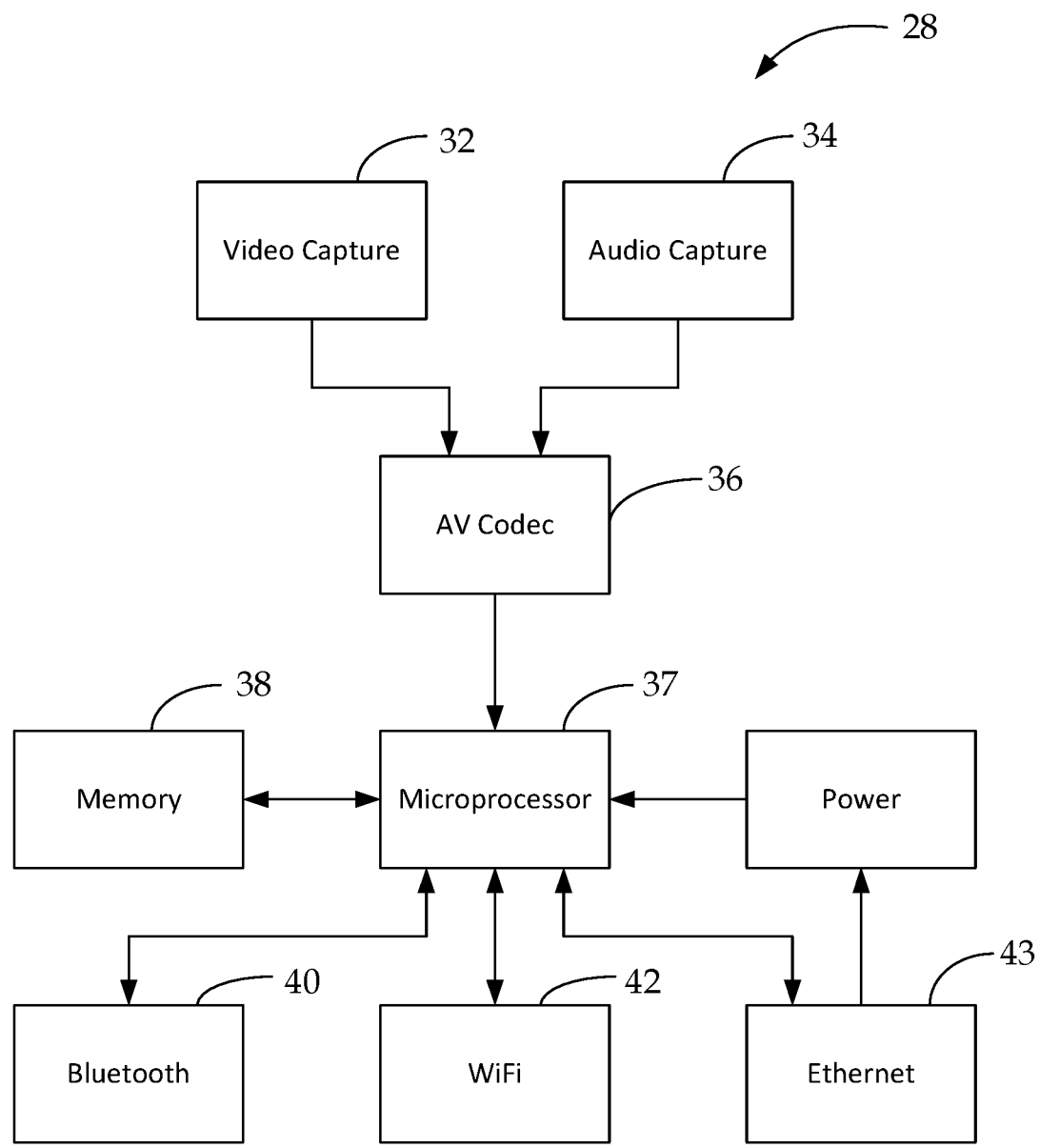
FIG. 2 is functional block diagram of the BWV device of FIG. 1.

Referring to the FIGS. 1 and 2, an integrated system of the present invention is generally indicated by reference numeral 10, which includes an ICV system 12 and BWV system 14. The ICV system 12 includes a video capture system 16, coupled to an audio capture system 18. The ICV system 12 is a powerful digital video management solution that automatically and securely manages in-car and other digital assets locally or across a network. The ICV system 12 is highly configurable and scalable to fit virtually any environment. The ICV system 12 supports simple and advanced searches, multi-camera synchronous playback, easy file duplication and provides database access to authorized users across the network.

The ICV system 12 utilizes an audio video codec 20, which encodes and decodes the video stream from the video capture system 14 and audio data stream from the audio capture system 18 under control of a microprocessor 21 temporary storage in a memory 23, and storage on the media storage 22 and for playback. The ICV system 12 also includes a wireless Ethernet interface 24, which may be configured to utilize an IEEE 802.11 b/g/n/ac or similar RF protocol, and a physical Ethernet port 26, which may be a power over Ethernet (PoE) port.

The BWV system 14 includes a body-worn audio/video device 28 and may include a docking station 30 for the body-worn audio/video device 28. The body-worn audio/video device 28 includes a video camera 32 and microphone 34 with an integrated AV codec 36, which encodes and decodes the video data stream from the video camera 32 and audio data stream from the microphone 34 under control of a microprocessor 37 for storage on the media storage 38 and playback. The storage media 38 may include RAM, SD cards, SSDs, Compact Flash disks, mSATA devices or the like, for example.

The body-worn audio/video device 28 may also include a Bluetooth transceiver 40 for communication with an access point 41, and a wireless Ethernet transceiver 42 for communication with the ICV system 12 wireless Ethernet interface 24 and an Ethernet port 43.

The docking station 30 is a simple Ethernet pass through device, with power for charging the BWV system as well. The access point 41 includes a Bluetooth transceiver 44 for communication with the body-worn audio/video device 28, a WiFi transceiver 45 and a physical Ethernet port 46, which may be a PoE port. When the body-worn audio/video device 28 is seated in the docking station 30, the body-worn audio/video device 28 is charged via the PoE port 43 through connector 47 connected to Ethernet port 46 and is capable of transferring files via Ethernet cable to the ICV system 12 Ethernet port 26.

Figure 3:
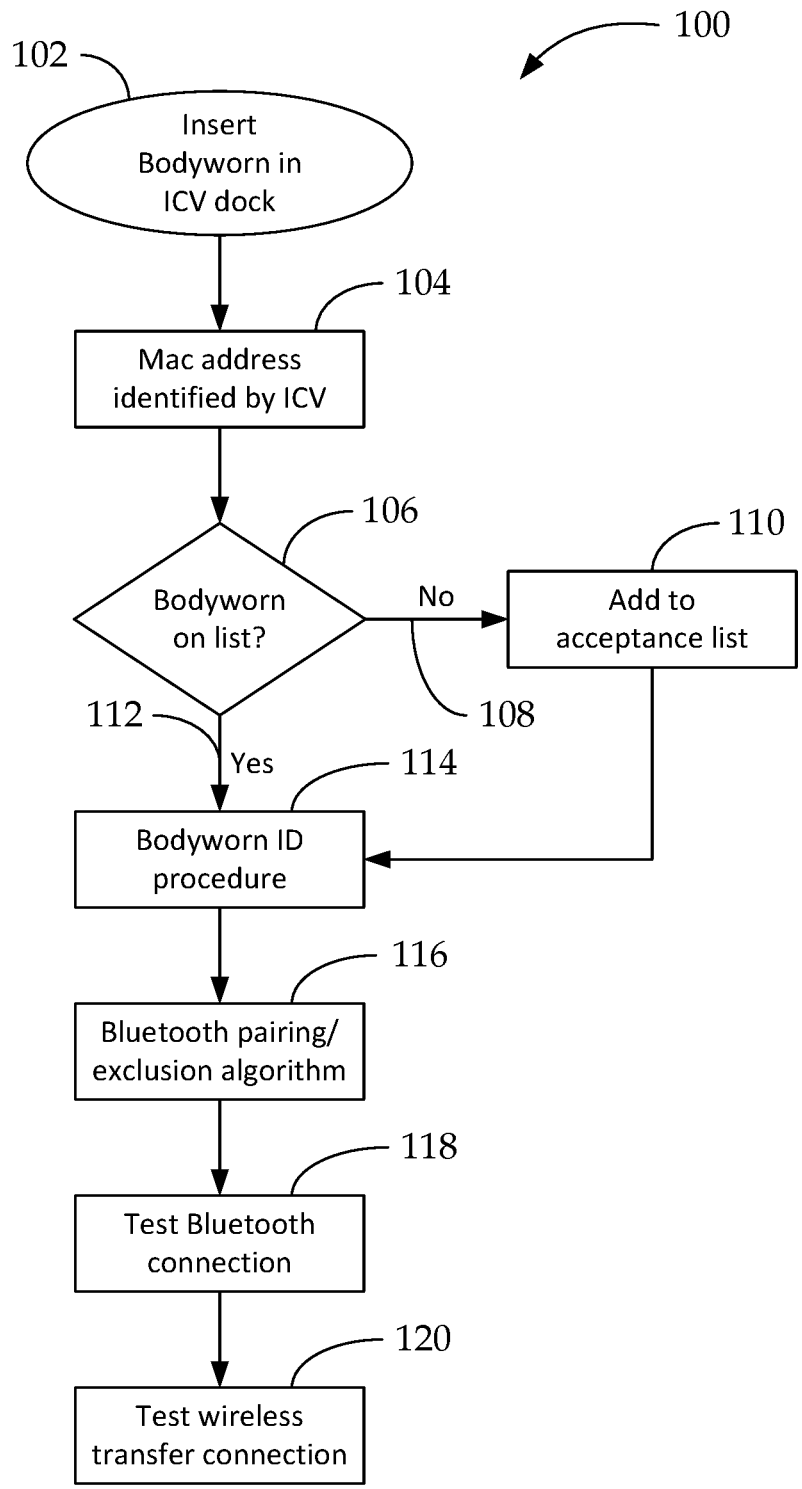
FIG. 3 is a software flow diagram of the methodology utilized to associate the BWV device to the ICV system.

Referring to FIGS. 1-3, the system association methodology is generally indicated by reference numeral 100. The system association methodology 100 begins by inserting the body-worn audio/video device 28 in the docking station 30, block 102. The MAC address of the body-worn audio/video device 28 is read by the ICV system 12 through the Ethernet ports 46 and 26 and identified, block 104. The ICV system 12 determines if the body-worn audio/video device 28 is on the acceptance list, block 106. If the body-worn audio/video device 28 has not been previously paired 108, then it is added to the acceptance list, block 110. Otherwise 112, the identification process procedure for the body-worn audio/video device 28 is completed, block 114. Next, the body-worn audio/video device 28 is paired with the ICV system 12, block 116. If the body-worn audio/video device 28 had previously been excluded from syncing or pairing with the ICV system 12, it is rejected for pairing. Optionally, the quality of the Bluetooth connection is checked, block 118, as well as the wireless transfer connection, block 120.

Figure 4:
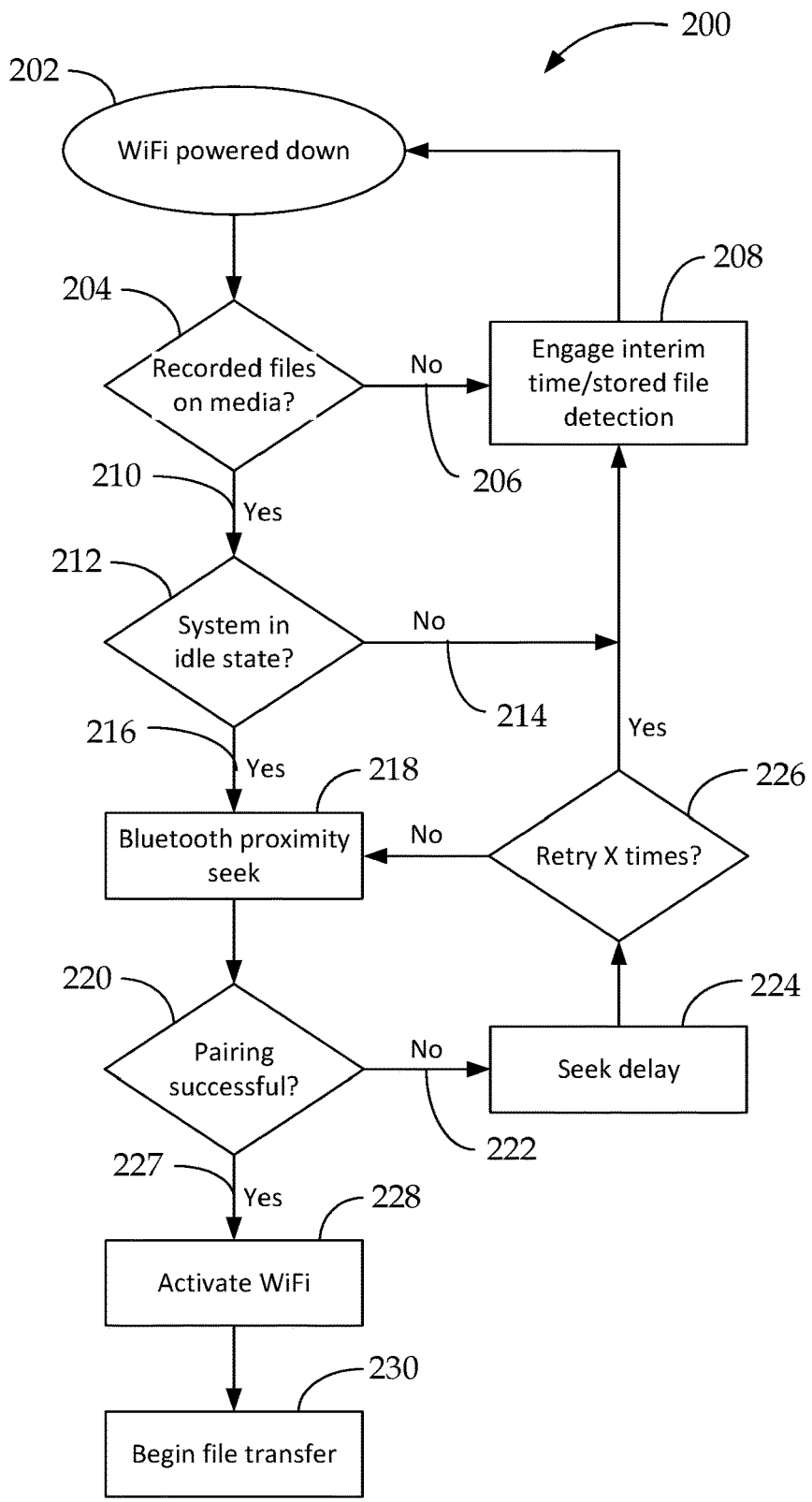
FIG. 4 is a software flow diagram of the methodology for proximity detection, used for transferring files from the BWV device to the ICV system.

Referring to FIGS. 1, 2 and 4, the BWV/ICV system wireless connection protocol is generally indicated by reference numeral 200. Initially the body-worn audio/video device 28 wireless Ethernet connection 42 is powered down 202. The body-worn audio/video device 28 checks for recorded media files on the media storage 38, block 204. If no media files are on the media storage 38, decision 206, then an interim timer is started to check for stored files on the media storage 38, block 208, and processing returns to the beginning state 202.

If media files are located 210, then a check is made as to whether the body-worn audio/video device 28 is in an idle state or recording state, block 212. If in a recording state 214, then an interim timer is started to check for stored files on the media storage 38, block 208, and processing returns to the beginning state 202. If in the idle state 216, the Bluetooth transceiver 40 proximity seek is activated 218 to attempt to pair with the docking station 30 or access point 41, block 220. If the pairing is not successful 222, the device seek is delayed for a predetermined period of time 224, and pairing is retried 226. The pairing process may repeat several times before an interim timer is started to check for stored files on the media storage 38, block 208, and processing returns to the beginning state 202.

If pairing of the body-worn audio/video device 28 and the docking station 30 or access point 41 is successful, 227, the wireless Ethernet transceiver 42 is activated 228 and the stored files are transferred 230 to through the ICV wireless Ethernet connection 24 to the media storage 22.

Figure 5:
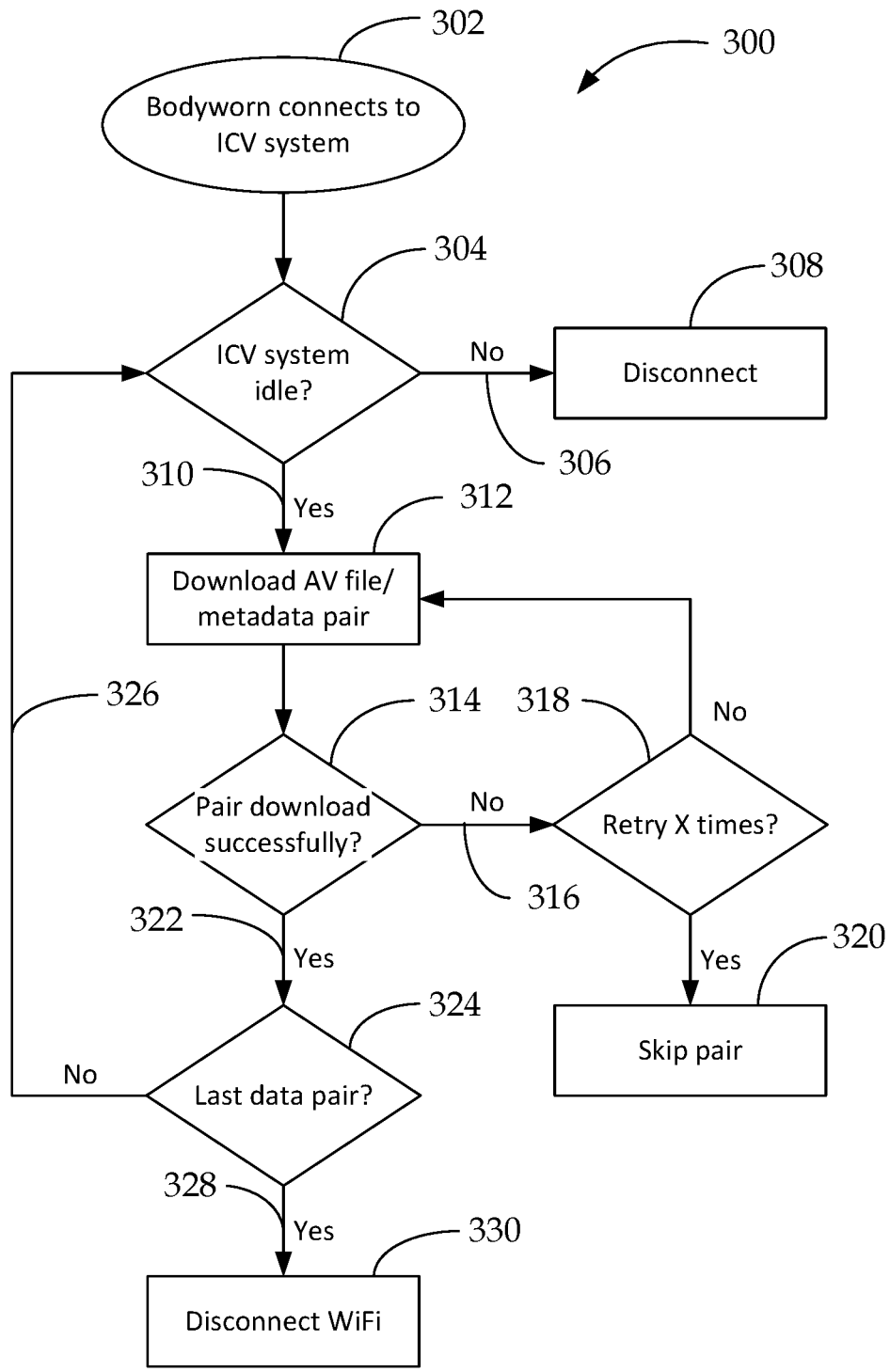
FIG. 5 is a software flow diagram of a methodology for file transfer from the BWV device to the ICV system.

Referring to FIGS. 1, 2 and 5, a file transfer protocol is generally indicated by reference numeral 300. After the body-worn audio/video device 28 wirelessly connects to the ICV system 12, block 302, a check is made as to the recording status of the ICV system 12, block 304. If the ICV system 12 is not idle, i.e. in the record mode, 306, the wireless connection with the body-worn audio/video device 28 is disconnected 308. If the ICV system 12 is idle 310, then the AV file and metadata pair are transferred 312 from the body-worn audio/video device 28 media storage 38 to the ICV system 12 media storage 22.

A check is made using a CRC, or other hash function to ensure that the files were accurately transferred 314. If the accuracy check fails 316, a counter is incremented 318 and the transfer is retried. If the counter exceeds a predetermined retry count, the pair of files is skipped 320. If the pair of files is successfully transferred 322, the system checks for additional files to be transferred 324. If the transferred pair of files was not the last pair 326, processing returns to block 304 to retrieve additional pairs of files. If the transferred pair of files was the last pair 328, then the wireless connection between the ICV system 12 and the body-worn audio/video device 28 is disconnected 330.

Figure 6:
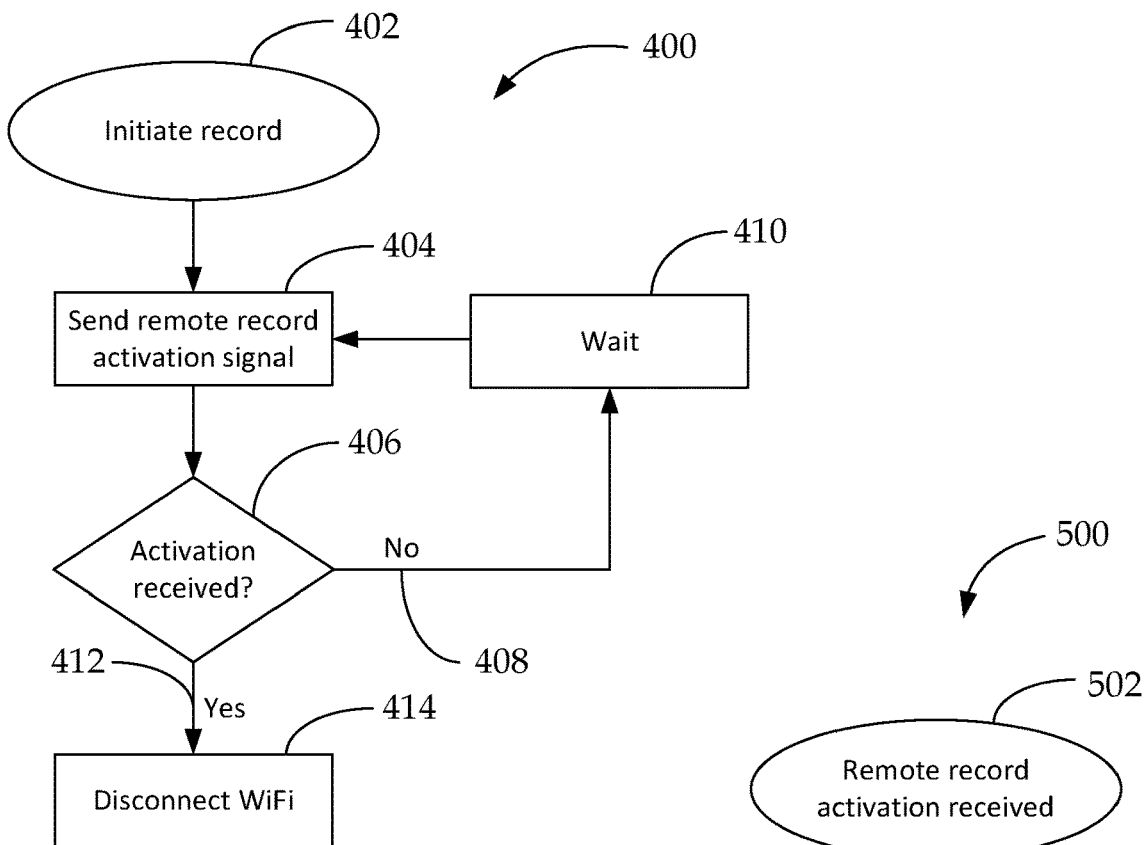
FIG. 6 is a software flow diagram for a requester remote record activation.
Figure 7:
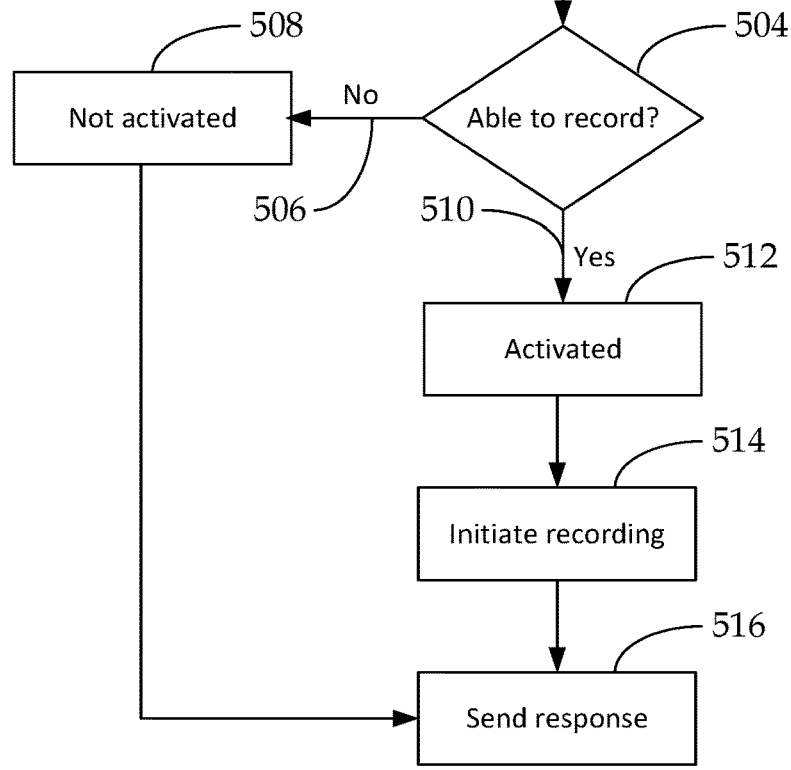
FIG. 7 is a software flow diagram for a responder remote record activation.

Referring to FIGS. 6 and 7, a requester remote record activation diagram is generally indicated by reference numeral 400, and a responder remote record activation diagram is general indicated by reference numeral 500. The requester can be either the ICV or the BWV device. If the requester is the ICV, then the BWV device may be within Bluetooth range for activation. If the requester is the BWV device, then the ICV may be within WiFi range for activation.

When a record is initiated 402, a remote record activation is sent 404 via Bluetooth or WiFi. Acknowledgement of the remote activation signal is checked 406. If an acknowledgement signal is not received 408, the system waits for a predetermined period of time 410, and then another remote record activation is resent 404. If the acknowledgement signal is received 412, then the remote record procedure is completed 414.

When a remote record activation is received 502, the ICV or BWV device determines if record can be activated 504. If record cannot be activated 506, activation is set to NO 508. If record can be activated 510, activation is set to YES 512 and recording is activated 514. The ICV or BWV device then sends a negative or positive activation response 516.

It is to be understood that while certain now preferred forms of this invention have been illustrated and described, it is not limited thereto except insofar as such limitations are included in the following claims.

Having thus described the invention, what is claimed as new and desired to be secured by Letters Patent is as follows:

1. In combination with an in-car video system, a body-worn video surveillance comprising:

a body-worn audio/video device having a video camera, a microphone, a microprocessor, a memory, a power supply, a MAC address, a connector, and a communication interface;

a docking station coupled to said in-car video system and having a power source, said docking station for receiving said connector;

wherein said in-car video system reads said MAC address of said body-worn audio/video device inserted into said docking station and determines if said MAC address of said body-worn audio/video device is on an acceptance list;

wherein if said MAC address of said body-worn audio/video device is on said acceptance list said in-car video system transfers information to said body-worn audio/video device to associate said body-worn audio/video device to said in-car video system;

wherein said body-worn audio/video device continuously records audio/video to a memory buffer;

wherein when said body-worn audio/video device is activated to record, said recorded audio/video from said memory buffer beginning just prior to activation of the body-worn audio/video device is stored in an audio/video file in said memory;

wherein said audio/video file stored in said memory of said body-worn audio/video device is transferred to said in-car video system;

wherein association of said body-worn audio/video device and said in-car video system is added to metadata of said audio/video file; and wherein said audio/video file is checked to ensure that said audio/video file was accurately transferred.

2. The combination of claim 1 wherein said docking station provides power to said body-worn audio/video device when said connector of said body-worn audio/video device is coupled to said docking station.

3. The combination of claim 1 wherein said communication interface includes a Bluetooth interface.

4. The combination of claim 1 wherein said communication interface includes a WiFi interface.

5. The combination of claim 1 wherein said communication interface includes an Ethernet interface.

6. A digital surveillance system comprising:
a video system having a video capture system, an audio capture system, a first microprocessor, a first memory, a digital storage media, a first Ethernet interface and a first WiFi interface;
an access point having a first Bluetooth interface, a second WiFi interface coupled to said first WiFi interface, and a second Ethernet interface coupled to said first Ethernet interface;
a portable video system having a video camera, a microphone, a second microprocessor, a second memory, a second Bluetooth interface coupled to said first Bluetooth interface, a third WiFi interface coupled to said second WiFi interface, a MAC address, and a third Ethernet interface;
wherein said video system reads said MAC address of said portable video system and determines if said MAC address of said portable video system is on an acceptance list;
wherein if said MAC address of said portable video system is on said acceptance list said video system transfers information to said portable video system to associate said portable video system to said video system;
wherein said portable video system continuously records audio/video to a memory buffer;
wherein when said portable video system is activated to record, said recorded audio/video from said memory buffer beginning just prior to activation of the body-worn audio/video device is stored in an audio/video file in said second memory;
wherein said audio/video file stored in said second memory of said portable video system is transferred to said video system;
wherein association of said portable video system and said video system is added to metadata of said audio/video file; and
wherein said audio/video file is checked to ensure that said audio/video file was accurately transferred.

7. The digital surveillance system of claim 6 further comprising a docking station having a fourth Ethernet interface coupled to said second Ethernet interface and selectively coupled to said third Ethernet interface.

8. The digital surveillance system of claim 7 wherein said portable video system transfers said audio/video file stored in said memory of said portable video system to said video system for storage in said digital storage media when said portable video system is coupled to said fourth Ethernet interface.

9. The digital surveillance system of claim 6 wherein said portable video system transfers said audio/video file stored in said memory of said portable video system to said video system for storage in said digital storage media when said third WiFi interface is coupled to said first WiFi interface.

10. The digital surveillance system of claim 6 wherein said portable video system transfers said audio/video file stored in said memory of said portable video system to said video system for storage in said digital storage media when said second Bluetooth interface is coupled to said first Bluetooth interface.

11. The digital surveillance system of claim 10 wherein said audio/video file is transferred via WiFi.

12. The digital surveillance system of claim 6 wherein said video system sends a record signal to said portable video system when said first Bluetooth interface is coupled to said second Bluetooth interface.

13. The digital surveillance system of claim 6 wherein said portable video system sends a record signal to said video system when said third WiFi interface is coupled to said second WiFi interface.

14. The digital surveillance system of claim 6 wherein said portable video system sends a record signal to said video system when said third WiFi interface is coupled to said first WiFi interface of said video system.

15. A digital surveillance system comprising:
a video system having a video capture system, an audio capture system, a first microprocessor, a first memory, a digital storage media, a first Ethernet interface and a first Win interface;
a docking station having a second Ethernet interface coupled to said first Ethernet interface;
an access point having a first Bluetooth interface, a second WiFi interface coupled to said first WiFi interface, and a third Ethernet interface coupled to said first Ethernet interface;
a portable video system having a video camera, a microphone, a second microprocessor, a second memory, a second Bluetooth interface coupled to said first Bluetooth interface, a third WiFi interface coupled to said second WiFi interface, a MAC address, and a fourth Ethernet interface selectively coupled to said second Ethernet interface;
wherein said video system reads said MAC address of said portable video system inserted in said docking station and determines if said MAC address of said portable video system is on an acceptance list;
wherein if said MAC address of said portable video system is on said acceptance list said video system transfers information to said portable video system to associate said portable video system to said video system;
wherein said portable video system continuously records audio/video to a memory buffer;
wherein when said portable video system is activated to record, said recorded audio/video from said memory buffer beginning just prior to activation of the body-worn audio/video device is stored in an audio/video file in said second memory;
wherein said audio/video file stored in said second memory of said portable video system is transferred to said video system;
wherein association of said portable video system and said video system is added to metadata of said audio/video file; and
wherein said audio/video file is checked to ensure that said audio/video file was accurately transferred.

16. The digital surveillance system of claim 15 wherein said portable video system transfers said audio/video file stored in said second memory of said portable video system to said video system for storage in said digital storage media when said portable video system is coupled to said second Ethernet interface.

17. The digital surveillance system of claim 15 wherein said portable video system transfers said audio/video file stored in said second memory of said portable video system to said video system for storage in said digital storage media when said third WiFi interface is coupled to said first WiFi interface.

18. The digital surveillance system of claim 15 wherein said portable video system transfers said audio/video file stored in said second memory of said portable video system to said video system for storage in said digital storage media when said second Bluetooth interface is coupled to said first Bluetooth interface.

19. The digital surveillance system of claim 18 wherein said audio/video file is transferred via WiFi.

20. The digital surveillance system of claim 15 wherein said video system sends a record signal to said portable video system when said first Bluetooth interface is coupled to said second Bluetooth interface.

21. A digital surveillance system comprising:
a video system having a video capture system, an audio capture system, a first microprocessor, a first memory, a digital storage media, a first Ethernet interface and a first WiFi interface;
a docking station having a second Ethernet interface coupled to said first Ethernet interface;
an access point having a first Bluetooth interface, a second WiFi interface coupled to said first WiFi interface, and a third Ethernet interface coupled to said first Ethernet interface; and
a portable video system having a video camera, a microphone, a second microprocessor, a second memory, a second Bluetooth interface coupled to said first Bluetooth interface, a third WiFi interface coupled to said second WiFi interface, a MAC address, and a fourth Ethernet interface selectively coupled to said second Ethernet interface;
wherein said system reads said MAC address of said portable video system inserted in said docking station and determines if said MAC address of said portable video system is on an acceptance list;
wherein if said MAC address of said portable video system is on said acceptance list said video system transfers information to said portable video system to associate said portable video system to said video system;
wherein said portable video system continuously records audio/video to a memory buffer;
wherein when said portable video system is activated to record, said recorded audio/video from said memory buffer beginning just prior to activation of the body-worn audio/video device is stored in an audio/video file in said second memory;
wherein said portable video system transfers said audio/video file stored in said second memory of said portable video system to said video system for storage in said digital storage media when said portable video system is coupled to said second Ethernet interface;
wherein said portable video system transfers said audio/video file stored in said second memory of said portable video system to said video system for storage in said digital storage media when said third WiFi interface is coupled to said first WiFi interface;
wherein said portable video system transfers said audio/video file stored in said second memory of said portable video system to said video system for storage in said digital storage media when said second Bluetooth interface is coupled to said first Bluetooth interface; and
wherein association of said portable video system and said video system is added to metadata of said audio/video file; and
wherein said audio/video file is checked to ensure that said audio/video file was accurately transferred.

22. The digital surveillance system of claim 21 wherein said audio/video file is transferred via WiFi.

23. The digital surveillance system of claim 21 wherein said video system sends a record signal to said portable video system when said first Bluetooth interface is coupled to said second Bluetooth interface.

24. In combination with an in-car video system, a body-worn video surveillance comprising:
a body-worn audio/video device having a video camera, a microphone, a microprocessor, a memory, a power supply, a MAC address, and a connector and a communication interface;
a docking station having a power source, said docking station for receiving said connector and coupled to said in-car video system;
wherein said in-car video system reads said MAC address of said body-worn audio/video device inserted into said docking station and determines if said MAC address of said body-worn audio/video device is on an acceptance list;
wherein if said MAC address of said body-worn audio/video device is on said acceptance list said in-car video system transfers information to said body-worn audio/video device to associate said body-worn audio/video device to said in-car video system;
wherein said body-worn audio/video device continuously records audio/video to a memory buffer;
wherein when said body-worn audio/video device is activated to record, said recorded audio/video from said memory buffer is stored in an audio/video file in said memory;
wherein association of said body-worn audio/video device and said in-car video system is added to metadata of said audio/video file; and
wherein said audio/video file stored in said memory of said body-worn audio/video device is transferred to said in-car video system.

25. The combination of claim 24 wherein said docking station provides power to said body-worn audio/video device when said connector of said body-worn audio/video device is coupled to said docking station.

26. The combination of claim 24 wherein said communication interface includes a Bluetooth interface.

27. The combination of claim 24 wherein said communication interface includes a WiFi interface.

28. The combination of claim 24 wherein said communication interface includes an Ethernet interface.

29. A digital surveillance system comprising:
a video system having a video capture system, an audio capture system, a microprocessor, a memory, a digital storage media, an Ethernet interface and a WiFi interface;
an access point having a Bluetooth interface, a WiFi interface coupled to said video system WiFi interface, and an Ethernet interface coupled to said video system Ethernet interface; and
a portable video system having a video camera, a microphone, a microprocessor, a memory, a Bluetooth interface coupled to said access point Bluetooth interface, a WiFi interface coupled to said access point WiFi interface, a MAC address, and an Ethernet interface selectively coupled to said video system Ethernet interface;

wherein said video system reads said MAC address of said portable video system and determines if said MAC address of said portable video system is on an acceptance list;

wherein if said MAC address of said portable video system is on said acceptance t said video system transfers information to said portable video system to associate said portable video system to said video system;

wherein said portable video system continuously records audio/video to a memory buffer;

wherein when said portable video system is activated to record, said recorded audio/video from said memory buffer is stored in an audio/video file in said portable video system memory;

wherein association of said portable video system and said video system is added to metadata of said audio/video file; and wherein said audio/video file stored in said portable video system memory is transferred to said video system.

30. The digital surveillance system of claim 29 further comprising a docking station having an Ethernet interface coupled to said Ethernet interface of said access point.

31. The digital surveillance system of claim 29 wherein said portable video system transfers said audio/video file stored in said memory of said portable video system to said video system for storage in said digital storage media when said portable video system is coupled to said Ethernet interface of said docking station.

32. The digital surveillance system of claim 29 wherein said portable video system transfers said audio/video file stored in said memory of said portable video system to said video system for storage in said digital storage media when said WiFi interface of said portable video system is coupled to said WiFi interface of said video system.

33. The digital surveillance system of claim 29 wherein said portable video system transfers said audio/video file stored in said memory of said portable video system to said video system for storage in said digital storage media when said Bluetooth interface of said portable video system is coupled to said Bluetooth interface of said access point.

34. The digital surveillance system of claim 33 wherein said audio/video file is transferred via WiFi.

35. The digital surveillance system of claim 29 wherein said video system sends a record signal to said portable video system when said Bluetooth interface of said access point is coupled to said Bluetooth interface of said portable video system.

36. The digital surveillance system of claim 29 wherein said portable video system sends a record signal to said video system when said WiFi interface of said portable video system is coupled to said WiFi interface of said access point.

37. The digital surveillance system of claim 29 wherein said portable video system sends a record signal to said video system when said WiFi interface of said portable video system is coupled to said WiFi interface of said video system.

38. A digital surveillance system comprising:

a video system having a video capture system, an audio capture system, a microprocessor, a memory, a digital storage media, an Ethernet interface and a WiFi interface;

a docking station having an Ethernet interface coupled to said Ethernet interface of an access point;

said access point having a Bluetooth interface, a interface coupled to said video system WiFi interface, and an Ethernet interface coupled to said video system Ethernet interface; and a portable video system having a video camera, a microphone, a microprocessor, a memory, a Bluetooth interface coupled to said access point Bluetooth interface, a WiFi interface coupled to said access point WiFi interface, a MAC address, and an Ethernet interface selectively coupled to said docking station Ethernet interface;

wherein said video system reads said MAC address of said portable video system inserted in said docking station and determines if said MAC address of said portable video system is on an acceptance list;

wherein if said MAC address of said portable video system is on said acceptance list said video system transfers information to said portable video system to associate said portable video system to said video system;

wherein said portable video system continuously records audio/video to a memory buffer;

wherein when said portable video system is activated to record, said recorded audio/video from said memory buffer is stored in an audio/video file in said portable video system memory;

wherein association of said portable video system and said video system is added to metadata of said audio/video file; and wherein said audio/video file stored in said portable video system memory is transferred to said video system.

39. The digital surveillance system of claim 38 wherein said portable video system transfers said audio/video file stored in said memory of said portable video system to said video system for storage in said digital storage media when said portable video system is coupled to said Ethernet interface of said docking station.

40. The digital surveillance system of claim 38 wherein said portable video system transfers said audio/video file stored in said memory of said portable video system to said video system for storage in said digital storage media when said WM interface of said portable video system is coupled to said WiFi interface of said video system.

41. The digital surveillance system of claim 38 wherein said portable video system transfers said audio/video file stored in said memory of said portable video system to said video system for storage in said digital storage media when said Bluetooth interface of said portable video system is coupled to said Bluetooth interface of said access point.

42. The digital surveillance system of claim 41 wherein said audio/video file is transferred via WiFi.

43. The digital surveillance system of claim 38 wherein said video system sends a record signal to said portable video system when said Bluetooth interface of said access point is coupled to said Bluetooth interface of said portable video system.

* * * * *